US008112442B2

(12) United States Patent
Itoh

(10) Patent No.: US 8,112,442 B2
(45) Date of Patent: Feb. 7, 2012

(54) COMMUNICATION DEVICE

(75) Inventor: Shingo Itoh, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 361 days.

(21) Appl. No.: 12/073,385

(22) Filed: Mar. 5, 2008

(65) Prior Publication Data

US 2008/0218810 A1  Sep. 11, 2008

(30) Foreign Application Priority Data

Mar. 5, 2007  (JP) ................................ 2007-054015
Jan. 18, 2008  (JP) ................................ 2008-008639

(51) Int. Cl.
*G06F 17/30* (2006.01)
(52) U.S. Cl. ...................................................... 707/781
(58) Field of Classification Search .................. 707/781
See application file for complete search history.

(56) References Cited

U.S. PATENT DOCUMENTS

| 5,579,392 | A | * | 11/1996 | Holzer | 380/243 |
| 5,737,539 | A | * | 4/1998 | Edelson et al. | 705/3 |
| 5,742,763 | A | * | 4/1998 | Jones | 719/317 |
| 5,761,664 | A | * | 6/1998 | Sayah et al. | 1/1 |
| 5,859,967 | A | * | 1/1999 | Kaufeld et al. | 726/5 |
| 5,914,727 | A | * | 6/1999 | Horan et al. | 345/503 |
| 6,292,811 | B1 | * | 9/2001 | Clancey et al. | 715/210 |
| 6,564,261 | B1 | * | 5/2003 | Gudjonsson et al. | 709/227 |
| 6,747,561 | B1 | * | 6/2004 | Reeves | 340/573.1 |
| 6,754,665 | B1 | * | 6/2004 | Futagami et al. | 1/1 |
| 6,978,129 | B1 | * | 12/2005 | Peon et al. | 455/419 |
| 7,040,539 | B1 | * | 5/2006 | Stover | 235/462.01 |
| 7,069,427 | B2 | * | 6/2006 | Adler et al. | 713/1 |
| 7,096,009 | B2 | * | 8/2006 | Mousseau et al. | 455/415 |
| 7,162,451 | B2 | * | 1/2007 | Berger et al. | 705/51 |
| 7,191,463 | B2 | * | 3/2007 | Dick | 726/1 |
| 7,237,268 | B2 | * | 6/2007 | Fields | 726/27 |
| 7,254,837 | B2 | * | 8/2007 | Fields | 726/27 |
| 7,272,610 | B2 | * | 9/2007 | Torres | 1/1 |
| 7,295,836 | B2 | * | 11/2007 | Yach et al. | 455/415 |
| 7,412,422 | B2 | * | 8/2008 | Shiloh | 705/74 |
| 7,496,575 | B2 | * | 2/2009 | Buccella et al. | 1/1 |

(Continued)

FOREIGN PATENT DOCUMENTS

JP  2002-111899 A2  4/2002

(Continued)

OTHER PUBLICATIONS

European Search Report issued in European Patent Application No. EP 08003979.5-1228/1968295, dated Oct. 1, 2008.

(Continued)

*Primary Examiner* — Mark Andrew X Radtke
(74) *Attorney, Agent, or Firm* — Banner & Witcoff, Ltd

(57) ABSTRACT

A communication device is provided, wherein specific individual information in a database that the communication device stores is viewable from a terminal connected to a network to promote information protection. A communication device can communicate with a terminal through the network. A storage stores the database including a plurality of records, each of which describes individual information. A receiver receives a readout-request, from the terminal, of a specific record in the database. A file creating module creates a terminal-viewable file based on one of the records, from the specific individual information in the record. A transmitter transmits, to the terminal, the file created based on the record designated by a received readout-request.

6 Claims, 6 Drawing Sheets

U.S. PATENT DOCUMENTS

| | | | |
|---|---|---|---|
| 7,546,334 B2* | 6/2009 | Redlich et al. | 709/201 |
| 7,610,285 B1* | 10/2009 | Zoellner et al. | 1/1 |
| 7,644,397 B2* | 1/2010 | Warren et al. | 717/131 |
| 7,669,051 B2* | 2/2010 | Redlich et al. | 713/166 |
| 7,673,794 B2* | 3/2010 | Yoshioka | 235/380 |
| 7,698,230 B1* | 4/2010 | Brown et al. | 705/75 |
| 2001/0037316 A1* | 11/2001 | Shiloh | 705/74 |
| 2002/0054334 A1* | 5/2002 | Harrison et al. | 358/1.15 |
| 2002/0065668 A1* | 5/2002 | Goodwin et al. | 705/1 |
| 2002/0081972 A1* | 6/2002 | Rankin | 455/41 |
| 2002/0128036 A1* | 9/2002 | Yach et al. | 455/552 |
| 2003/0037110 A1* | 2/2003 | Yamamoto | 709/204 |
| 2003/0117665 A1* | 6/2003 | Eguchi et al. | 358/402 |
| 2003/0215092 A1* | 11/2003 | Dick | 380/246 |
| 2004/0170125 A1* | 9/2004 | O'Neill | 370/230 |
| 2004/0208320 A1* | 10/2004 | Chen | 380/246 |
| 2005/0048958 A1* | 3/2005 | Mousseau et al. | 455/415 |
| 2005/0097171 A1* | 5/2005 | Hikichi | 709/204 |
| 2005/0267797 A1* | 12/2005 | Takahashi et al. | 705/11 |
| 2006/0041586 A1* | 2/2006 | Nassef | 707/104.1 |
| 2006/0047644 A1* | 3/2006 | Bocking et al. | 707/4 |
| 2006/0053032 A1* | 3/2006 | Weiler et al. | 705/2 |
| 2006/0074983 A1* | 4/2006 | Jones | 707/104.1 |
| 2006/0144924 A1* | 7/2006 | Stover | 235/379 |
| 2006/0168344 A1* | 7/2006 | Tsuchiya | 709/245 |
| 2006/0218149 A1* | 9/2006 | Patrick | 707/9 |
| 2006/0265508 A1* | 11/2006 | Angel et al. | 709/230 |
| 2007/0030528 A1* | 2/2007 | Quaeler et al. | 358/453 |
| 2007/0064682 A1* | 3/2007 | Adams et al. | 370/352 |
| 2008/0086646 A1* | 4/2008 | Pizano | 713/189 |
| 2008/0102238 A1* | 5/2008 | Swords | 428/40.1 |
| 2008/0104021 A1* | 5/2008 | Cai et al. | 707/3 |
| 2008/0115087 A1* | 5/2008 | Rollin et al. | 715/811 |
| 2008/0156855 A1* | 7/2008 | Sanchez | 229/71 |
| 2008/0168352 A1* | 7/2008 | Mehrotra et al. | 715/713 |
| 2009/0164292 A1* | 6/2009 | Omiya | 705/9 |

FOREIGN PATENT DOCUMENTS

| | | |
|---|---|---|
| JP | 2004-312317 A2 | 11/2004 |
| JP | 2006-157922 | 6/2006 |
| JP | 2007-020063 | 1/2007 |
| JP | 2007-027963 | 2/2007 |

OTHER PUBLICATIONS

EP Examination Report dtd Mar. 18, 2011, EP Appln. 08003979.5.
Office Action issued in corresponding Japanese Application No. 2008-008639, mailed Sep. 27, 2011.

* cited by examiner

COMMUNICATION DEVICE

CROSS-REFERENCE TO RELATED APPLICATION

This application claims priority to Japanese Patent Application No. 2007-54015, filed on Mar. 5, 2007, the contents of which are hereby incorporated by reference into the present application. This application also claims priority to Japanese Patent Application No. 2008-8639, filed on Jan. 18, 2008, the contents of which are hereby incorporated by reference into the present application.

BACKGROUND OF THE INVENTION

1. Field of the Invention

The technology disclosed by this specification relates to a communication device that communicates with a terminal through a network.

2. Description of the Related Art

A technology is known that a communication device (facsimile machine, for example) reads out all telephone book data stored in a one-touch dial storage area, transmits the readout telephone book data to a terminal as one file of a text data format in an attachment to an electronic mail. For example, Japanese Patent Application Publication No. 2004-312317 discloses a facsimile machine having such a function.

BRIEF SUMMARY OF THE INVENTION

In the technology disclosed in Japanese Patent Application Publication No. 2004-312317, all the telephone book data stored in the one-touch dial storage area are transmitted to the terminal as one file. The telephone book data stored in the communication device is viewable on the terminal. However, since all the data described in the telephone book data are transmitted to the terminal as one file, needless telephone book data will also be viewable. It is not preferable, from the viewpoint of security, that the telephone book data, which includes personal data such as telephone number or the like, is indiscriminately viewed. For example, there are cases where the user of a communication device operates the terminal outside his/her home to learn a telephone number and read the telephone number stored in the communication device. Although it is enough for the user to know the telephone number of an address to which he/she intends to make a phone call, all telephone numbers must be outputted in order to view a target telephone number in the technology of Japanese Patent Application Publication No. 2004-312317.

Accordingly, there is a demand for a security-improved communication device that designates only specific individual information of a database stored in the communication device as viewable data. This specification discloses a technology that realizes such a communication device.

The communication device disclosed by this specification is a communication device communicable with a terminal through a network. The communication device comprises a storage, a receiver, a file creating module and a transmitter. The storage stores the database includes a plurality of records, each of which describes individual information. The receiver receives a readout-request, from the terminal, of a specific record in the database. In other words, the receiver receives a readout-request for the specific record in the database. The readout-request is one of the commands for controlling the communication device from the terminal. The readout-request designates the specific record. The file creating module creates a file having a format that is viewable from the terminal, from individual information described in a record. In this specification, the "file having a format that is viewable from the terminal" is referred to as "terminal-viewable file". The file creating module creates one terminal-viewable file for one record. Specifically, the file creating module creates files on a record basis.

The transmitter transmits a file that the file creating module created based on the specific record designated by the received readout-request to the terminal.

Each record describes the above individual information (personal data such as telephone number or the like, for example). The database being the mass of a plurality of records is equivalent to the above-described telephone book data, for example. Regarding the record designated by the received readout-request, the communication device transmits, to the terminal that transmitted the readout-request, the terminal-viewable file that the file creating module created based on the record. Therefore, the user of the terminal can view desired individual information of the transmitted terminal-viewable file from the communication device. Specifically, the communication device can selectively provide particular individual information as terminal-viewable file from the database being stored.

According to the technology disclosed in this specification, only a specific record among the plurality of records stored in the communication device (the telephone book data for example) is viewable from the terminal connected to a network to improve security.

DETAILED DESCRIPTION OF THE INVENTION

Figure 1:
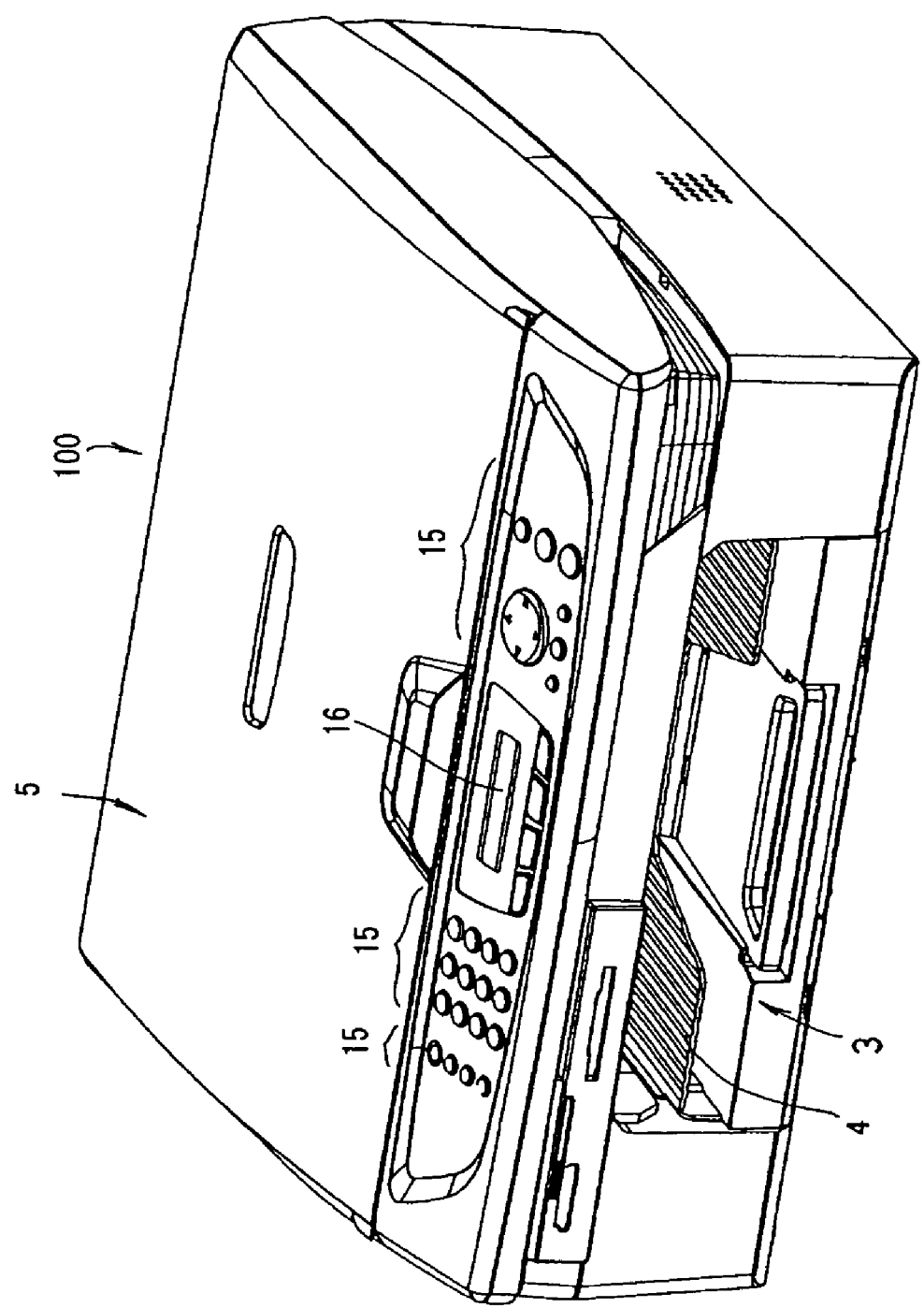
FIG. 1 shows a schematic view of a facsimile machine (communication device).

Hereinafter, a description will be made for preferable embodiments of the present invention referring to the attached drawings. The communication device of the example is a facsimile machine 100. FIG. 1 is the external view (schematic view) of the facsimile machine 100.

A scanner section 5 for reading a document when performing facsimile transmission is disposed on the upper portion of the main body of the facsimile machine 100.

An operation key group 15 (operation keys) for inputting numerical values, characters, various commands or the like and an LCD 16 (display section) for displaying a menu, an operation procedure or the state of a process being executed are provided on the upper front part of the main body of the facsimile machine 100. The operation key group 15 includes a plurality of one-touch keys. Each of the telephone numbers or each of the e-mail addresses corresponds to each of one-touch keys. The telephone numbers and the e-mail addresses are stored in the storage as described later. The user, only with pushing the one-touch key, can access a telephone number or an e-mail address corresponding to the key. Note that there are cases where the telephone number or the e-mail address is generically referred to as "address information" in this specification.

A paper feeding cassette 3 and a paper discharging portion 4 are disposed on the lower part of the main body of the facsimile machine 100. The facsimile machine 100 feeds a recording paper set in the paper feeding cassette 3, and discharges it to the paper discharging portion 4. Further, the facsimile machine 100 prints an image output by facsimile data received by a facsimile function on the recording paper set in the paper feeding cassette 3, and discharges it to the paper discharging portion 4.

Figure 2:
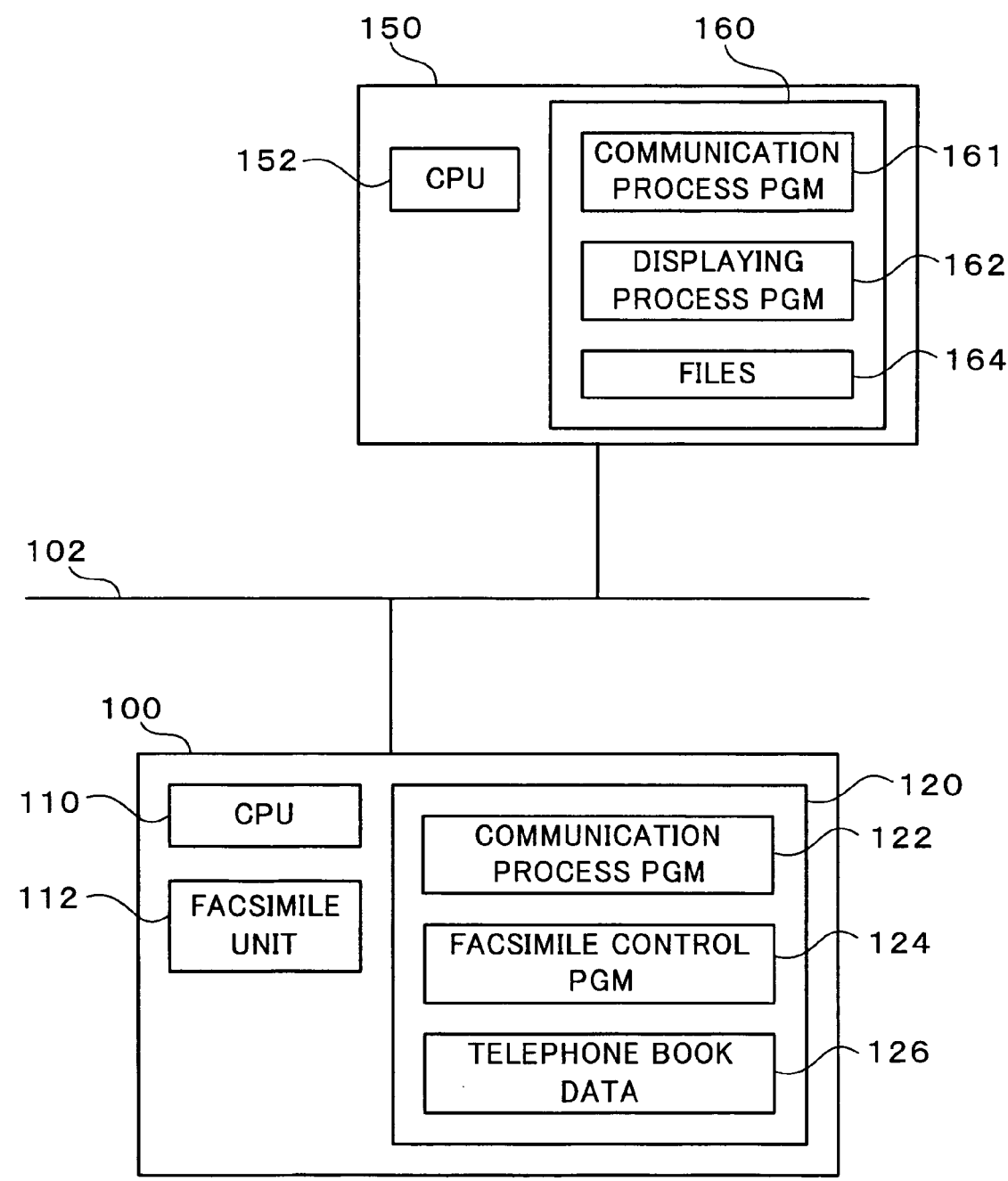
FIG. 2 shows a block diagram of the facsimile machine (communication device).

Now referring to FIG. 2, a description will be made for the electrical constitution of the facsimile machine 100 and the terminal 150. FIG. 2 shows the block diagram of the facsimile machine 100. The facsimile machine 100 is connected to the terminal 150 through a LAN 102 and can perform communication with the terminal.

The facsimile machine 100 comprises a CPU 110, a storage 120, a facsimile unit 112 and the like.

The facsimile unit 112 has a scanner, a network control unit (hereinafter, referred to as an "NCU"), a modem, a buffer, an encoding section, a decoding section and a printer, specifically. The CPU 110 of the facsimile machine 100 controls each section of the device according to various signals transmitted/received through the NCU that performs line control, and executes a facsimile operation, that is, data communication.

The storage 120 stores control programs executed by the facsimile machine 100 and the telephone book data 126 stored in the facsimile machine 100. Further, the storage 120 also has a memory for temporarily storing various data in executing each operation of the facsimile machine 100.

The facsimile unit 112 can perform facsimile transmission for transmitting images read by a scanner to a transmission address described in telephone book data (described later). Further, the facsimile unit 112 can transmit document data sent from the terminal 150 to a transmission address described in the telephone book data.

The CPU 110 executes various processes based on programs stored in the storage 120. The processes executed by the CPU 110 are a process for controlling the facsimile unit 112, a data transmitting/receiving process with the terminal 150 or the like, for example.

The storage 120 stores various programs and data. Programs stored in the storage 120 are a communication processing program 122 and a facsimile control program 124. Note that the letters "PGM" shown in FIG. 2 means a program.

A description will be made for various programs and data stored in the storage 120.

The communication processing program 122 describes a process of receiving commands and data transmitted from the terminal 150. Further, the communication processing program 122 also describes a process of transmitting files or the like to the terminal in response to a received process.

Commands that the facsimile machine 100 receives from the terminal 150 are a file list requesting command, a file readout command, a file writing command and the like, for example. Processes in response to these commands will be described later.

The facsimile control program 124 describes a process of controlling the facsimile unit 112.

Next, a description will be made for the terminal 150. The terminal 150 is a personal computer connected to the network 102. The terminal 150 comprises a CPU 152 and a storage 160. Further, the terminal 150 comprises a display (not shown).

The CPU 152 executes various processes based on programs stored in the storage 160. The storage 160 stores a communication processing program 161, a displaying processing program 162 and files 164. The communication processing program 161 describes a process of transmitting/receiving commands and data with the facsimile machine 100. The displaying processing program 162 describes a process for displaying information such as a file and a folder, or an error message received from the facsimile machine 100 on the display. The files 164 are files created by the user of the terminal 150, files received from the facsimile machine 100, and the like.

The communication processing program 122 of the facsimile machine 100 and the communication processing program 161 of the terminal 150 describe a communication protocol based on a file-sharing protocol. Therefore, the facsimile machine 100 and the terminal 150 can transmit/receive data and commands based on the file-sharing protocol. The file-sharing protocol is a WebDAV (Web-based Distributed Authoring and Versioning), for example.

The file-sharing protocol defines several commands transmitted/received between the terminal 150 and the facsimile machine 100. For example, the WebDAV defines a PROPFIND command (file list requesting command), a GET command (file readout command), a PUT command (file writing command) and the like. The PROPFIND command is a command for requesting transmission of the list information of files that the other device (the terminal 150 or the facsimile machine 100) stores. The PROPFIND command may be referred to as "list-request". The GET command and the PUT command designate a particular file (file name). The GET command is a command for requesting transmission of the designated file to the other device in the case where the other device has the designated file. In other words, the GET command is a command for reading out the designated file from the other device. The GET command may be referred to as "readout-request". The PUT command designates a particular file name, and transmits a file having the designated file name. The PUT command is a command for requesting the other device to store the designated file. In other words, the PUT command is a command for writing the designated file in the other device.

The facsimile machine 100 and the terminal 150 can transmit/receive the information of file list or files by transmitting/receiving the commands.

Figure 3:
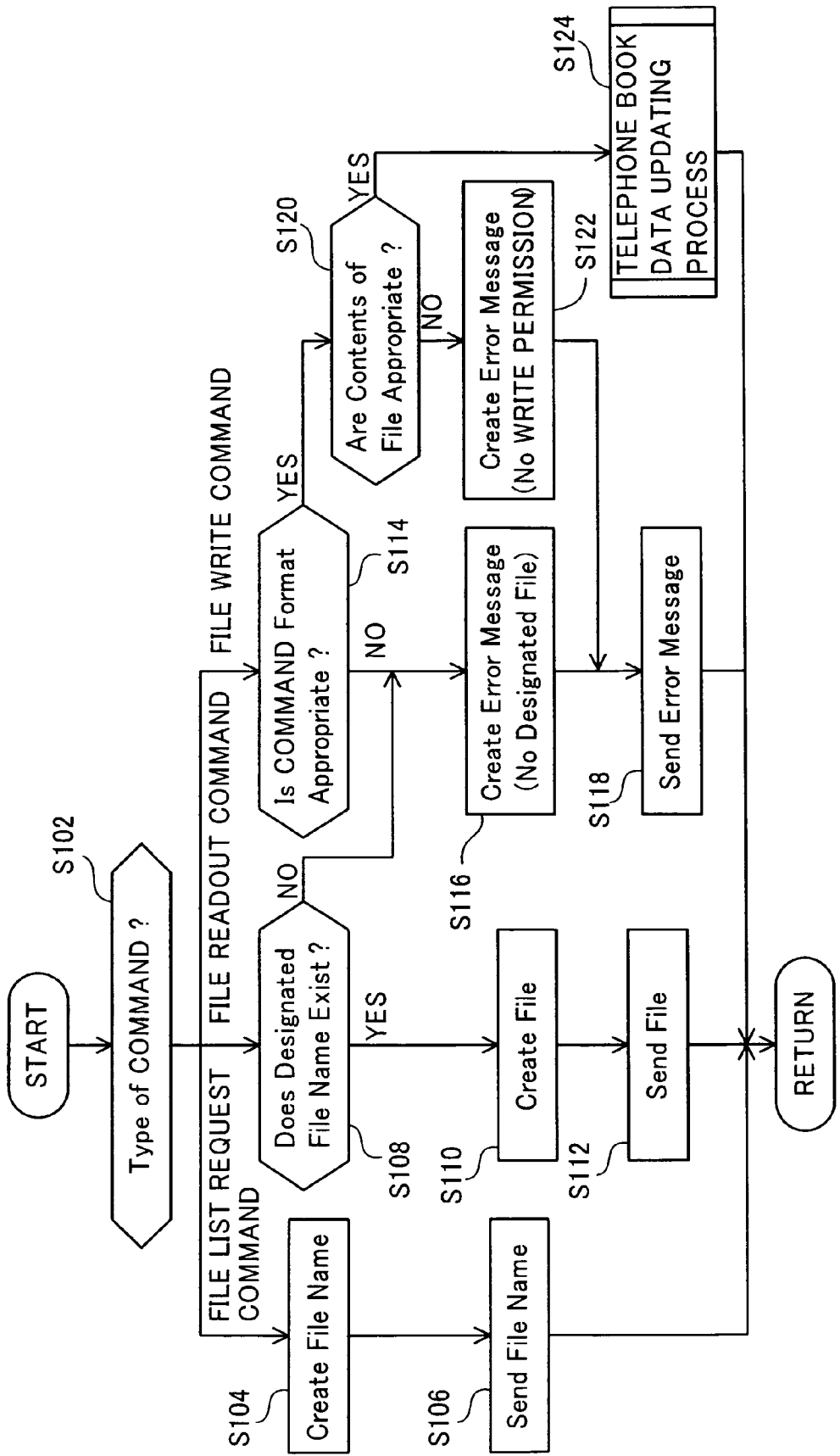
FIG. 3 shows a flowchart of the process performed by the facsimile machine.

A specific description will be provided for the process executed by the CPU 110 of the facsimile machine 100. FIG. 3 is the flowchart of the communication process diagram between the facsimile machine 100 and the terminal 150.

When the facsimile machine 100 receives a command from the terminal 150, it executes this process. More specifically, the CPU 110 reads out the communication processing program 122 to start execution.

First, the facsimile machine 100 specifies the type of command received from the terminal 150 (step S102). In the case where the received command is the file list request command ("list-request" or PROPFIND command), step S104 is executed. In the case where the received command is the file readout command ("readout-request" or GET command), step S108 is executed. In the case where the received command is the file write command (PUT command), step S114 is executed.

A description will be made for the process when the file list request command (list-request) is received.

The facsimile machine 100, on receiving the file list request command, creates a predetermined file name based on the telephone book data 126 being stored (step S1104).

Figure 4:
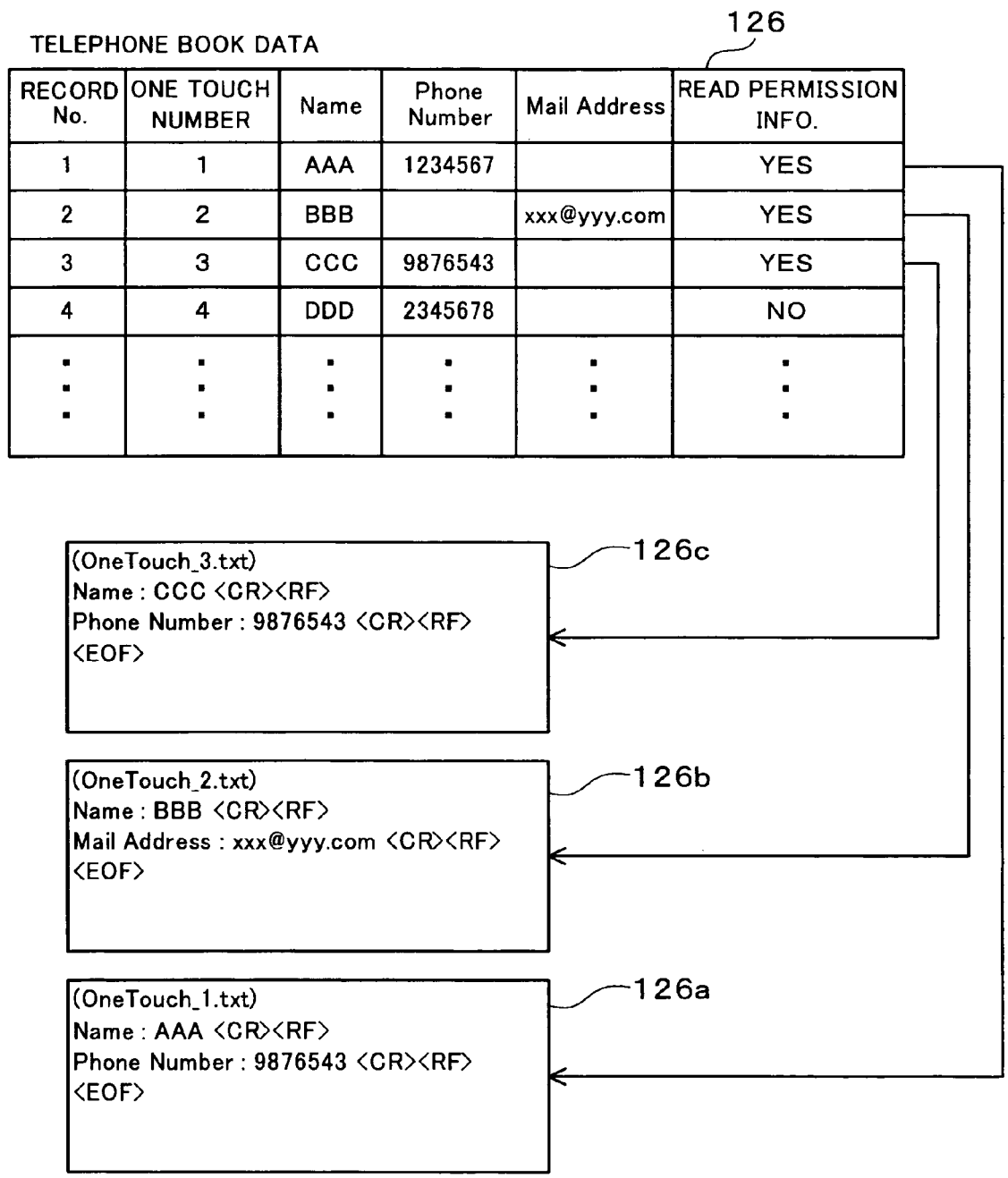
FIG. 4 shows an example of telephone book data.

FIG. 4 shows the data structure of the telephone book data 126. The telephone book data 126 is data where address names (Name) corresponds to addresses (at least one of telephone number and e-mail address). Pairs of the address name and the address are stored as one record. Specifically, the telephone book data 126 is a plurality of records where address names corresponds to addresses. A record number is attached to each record. For example, in the record of record number "1", a telephone number "1234567" corresponds to an address name "AAA". As for the record of record number "2", an e-mail address "xxx@yyy.com" corresponds to an address name "BBB". As for the record of record number "3", a telephone number "9876543" corresponds to an address name "CCC". As for the record of record number "4", a telephone number "2345678" corresponds to an address name "DDD".

A one-touch number corresponds to each record. For example, the one-touch number "1" corresponds to the record of record number "1". Each one-touch number corresponds to each one-touch key (operation key 15). For example, the one-touch number "1" corresponds to "1" of the one-touch key (one of the operation keys 15) of the facsimile machine 100. When the user pushes the one-touch key "1", the telephone number "1234567" in the record of record number "1" is read out. The one-touch number is also used as a file name in transmitting a file to the terminal 150.

Furthermore, each record has read permission/prohibition information. The "read permission/prohibition information" is a flag for determining whether readout of record is permitted or prohibited to the terminal 150. In other words, the flag determines whether or not to allow the terminal to view the record. For example, a flag of "NO" (flag of readout prohibition or flag of prohibiting viewing) is set to the record of record number "4". The facsimile machine 100 does not create the file name of a record to which the flag of "NO" is set (record number "4") when it receives the list-request from the terminal 150 is received. On the other hand, the facsimile machine 100 creates the file name of a record in which the flag of "YES" (read permission flag or flag of allowing viewing) is set to read permission/prohibition information when it receives the list-request from the terminal 150. When the facsimile machine 100 receives the list-request from the terminal 150, it creates only the file names of the records in which the flag of "YES" is set to the read permission/prohibition information, and transmits them to the terminal 150. Specifically, the facsimile machine 100 creates only file names corresponding to the record numbers "1", "2" and "3" without creating the file name of the record number "4", and transmits them to the terminal 150.

The telephone book data 126 itself is one bundle data (database). In the process of step S104, the same number of file names as stored records (which is the number of records in which "YES" is set to the read permission/prohibition information) are created from a bundle of the telephone book data 126. In step S104, a record number is added to a character spelling "OneTouch_", and then, a file name with "txt" as an extension is created. The telephone book data 126 shown in FIG. 4 includes four records with record numbers "1", "2", "3" and "4". Of these numbers, regarding the three records of the record number "1", "2" and "3", "YES" is set to the read permission/prohibition information. The facsimile machine 100 creates three file names of "OneTouch_1.txt", "OneTouch_2.txt" and "OneTouch_3.txt" corresponding to the record numbers of the three records. Each file name corresponds to each one-touch number in the telephone book data 126.

Now a description returns to the flowchart of FIG. 3.

In step S106, all file names created in step S104 are transmitted to the terminal 150. Specifically, the facsimile machine 100 transmits the information of the list of records included in the telephone book data to the terminal 150 as the information of the list of file names.

Note that the terminal 150 that receives the file names from the facsimile machine 100 displays the received file names on a display unit. Simultaneously, the terminal 150 displays icons expressing each of the received file names in a corresponding manner (refer to FIG. 6).

A description will be made for the process when the file readout command (readout-request) is received.

The facsimile machine 100, on receiving the file readout command, judges whether or not a file name designated by the file readout command exists (step S108). The following process is specifically performed in judging whether or not the designated file name exists. The facsimile machine 100 creates file names corresponding to the records included in the telephone book data 126 similar to the process of step S104. In the case where the file name designated by the file readout command is included in the created file names, the facsimile machine 100 judges that the file name designated by the file readout command exists. In other words, whether or not a record number specified by the file name designated by the file readout command matches a number of a record included in the telephone book data 126 is judged in the process of step S108. At this point, whether or not the designated file name exists may be judged by comparing to a one-touch number included in the telephone book data 126 instead of creating a file name.

In the case where the file name designated by the file readout command does not exist (step S108:NO), the facsimile machine 100 creates an error message notifying that the designated file does not exist (step S116). Next, the created error message is transmitted to the terminal 150 (step S118).

In the case where the file name designated by the file readout command exists (step S108:YES), the facsimile machine 100 creates a file having the designated file name (step S110).

A specific description will be made for the process of step S110. In the case where the file name designated by the file readout command (readout-request) exists, the file name corresponds to a specific record number. In other words, the file readout command designates the record. The facsimile machine 100 converts one record specified by the designated file name (one record designated by the file readout command) into one text file. The text file is viewable by the terminal 150. The "file having a format viewable by the terminal" is referred to as a "terminal-viewable file". The text file is a typical "terminal-viewable file".

The facsimile machine 100 creates the terminal-viewable file on a record basis. Specifically, the text file is created based on a record designated by the received the file readout command in step S110. In other words, a record designated by the received file readout command is converted into the text file in step S110.

A description will be made for an example of the text file to be converted referring to FIG. 4. In the case where file name designated by the file readout command is "OneTouch_1.txt", the file name "OneTouch_1.txt" corresponds to the record of record number "1". The facsimile machine 100 reads out the record of record number "1" and converts the contents of the record into one text file. The record of record number "1" is converted into a text file 126a as shown in FIG. 4. <CR> shown in the text file 126a means the control code of carriage return in the text file. <LF> means the control code of line feed in the text file. <EOF> means the control code of end-of-file in the text file. Specifically, the record of record number "1" is converted into two lines of a text file 126a where a text character string on the first line of file text is "Name:AAA" and a text character string on the second line is "Phone Number:1234567".

In the case where a file name designated by the file readout command is "OneTouch_2.txt", the facsimile machine 100 reads out the record of record number "2" specified by the file name "OneTouch_2.txt", and converts it into a text file 126b. The text file 126b is two lines of text file in which a text character string on the first line is "Name:BBB" and a text character string on the second line is "Mail Address: xxx@yyy.com". Similarly, in the case where a file name designated by the file readout command is "OneTouch_3.txt", the facsimile machine 100 reads out the record of record number "3" specified by the file name "OneTouch_3.txt", and converts it into a text file 126c. The text file 126c is two lines of text file in which a text character string on the first line is "Name:CCC" and a text character string on the second line is "Phone Number:9876543".

As described, the facsimile machine 100 converts one record specified by a file name designated by the file readout command into one text file in step S110.

Next, in step S112, the facsimile machine 100 transmits the text file converted in the process of step S110 to the terminal 150.

The terminal 150 receives the text file where the one record in the telephone book data 126 is converted. Even in the case where the telephone book data 126 includes a large number of records, the user of the terminal 150 can view or edit only the specific record as a text file. The facsimile machine 100 does not transmit records other than the record designated by the file readout command to the terminal 150. The facsimile machine 100 does not disclose records other than the record designated by the file readout command to the user.

Next, a description will be made for the process when the file write command (PUT command) is received.

The facsimile machine 100, on receiving the file write command, judges whether or not the format of the command is appropriate (step S114). Further, the facsimile machine 100 judges whether or not a file designated by the file write command exists in step S114. The terminal 150 transmits a predetermined file name or a file together with the file write command. Therefore, "judges whether or not a file designated by the file write command exists" may be translated into "judges whether or not a file name or a file is received together with the file write command". In the case where the format of the file write command is not appropriate (step S114:NO), that is, in the case where the designated file does not exist, the facsimile machine 100 creates an error message notifying that the designated file does not exist (step Si16). Next, the created error message is transmitted to the terminal 150 (step S118).

In the case where the format of the file write command is appropriate (step S114:YES), the facsimile machine 100 judges whether or not the contents of the designated file (the file received together with the file write command) is appropriate (step S120). Specifically, whether or not the contents of the designated file include a character string "Name:" is confirmed in step S120. In the case where the character string "Name:" is included, whether or not the contents includes at least one of a character string "Phone Number:" or a character string "Mail Address:" is confirmed next. In the case where at least one of the two character strings is included, it is judged that the designated file is appropriate. In other words, it is judged that writing is permitted to the designated file. Specifically, in the case where a previously determined particular character string exists in the designated file in step S120, it is judged that the file is appropriate Oudged that writing is permitted to the file). The particular character string is the item name of a record of the telephone book data. With this judgment, the facsimile machine 100 judges that the contents of the file designated by the file write command corresponds to the record of the telephone book data.

In the case where the file designated by the file write command is not appropriate (step S120:NO), the facsimile machine 100 creates an error message notifying no write permission (step S122), and transmits the created error message to the terminal 150 (step S118).

In the case where the file designated by the file write command is appropriate (step S120:YES), the facsimile machine 100 updates the telephone book data 126 by the contents of the designated file (step S124).

Figure 5:
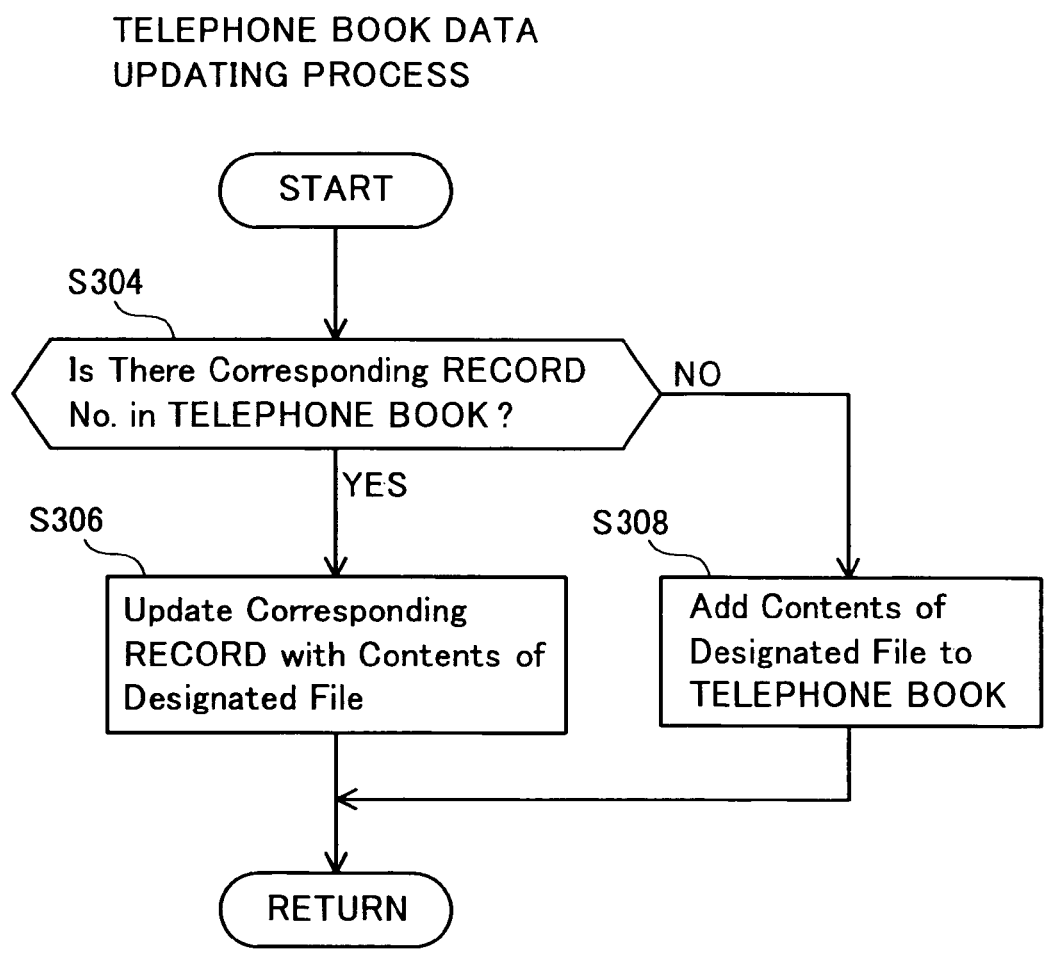
FIG. 5 shows a flowchart of the updating process of the telephone book data.

Next, a description will be made for the updating process of the telephone book data (step S124 of FIG. 3). FIG. 5 shows the flowchart of the updating process of the telephone book data 126.

The facsimile machine 100 reads out a file name designated by the file write command. Then, the facsimile machine 100 judges whether a record corresponding to the file name exists in the telephone book data 126 (step S304). More specifically, the machine 100 judges whether or not the readout file name consists of the character string "OneTouch_" and the subsequent figure. In the case where the file consists of the character string "OneTouch_" and the subsequent number, it searches a record where the number following the character string "OneTouch_" matches a one-touch number of the telephone book data 126 from the telephone book data 126. In the case where the record whose number matches the number exists in the telephone book data 126 (step S304:YES), the record of the corresponding number is overwritten/updated by the contents of the designated file (step S306). On the other hand, in the case where the corresponding record does not exist in the telephone book data 126 (step S304:NO), a new record is added to the telephone book data 126, and the contents of the designated file is written in the added record (step S308). Note that a new record number is attached to the added record. At this point, a record attached with a new one-touch number may be created. Furthermore, at this point, the newly attached one-touch number may be notified to the terminal 150 that transmitted the file write command. In step S120 shown in FIG. 3, the fact that the item names of the records of the telephone book data are described in the designated file is confirmed. Specifically, data of each item of the records (address name and telephone number or e-mail address) exists in the designated file. Therefore, it is possible to write each item described in the designated file in the records.

In this example, in the case of judging that a record corresponding to the file name does not exist in the telephone book data 126 regardless of whether the file name is constituted with the character string "OneTouch_" and the subsequent number or not, a common process is performed. However, it is not necessary to limit the embodiment to such a process. For example, in the case where a record that matches the number following the character string "OneTouch_" does not exist, a process of adding it to a newly created record including the file number may be performed. An error message may be transmitted in the case where the file name is not constituted with the character string "OneTouch_" and the subsequent number.

Figure 6:
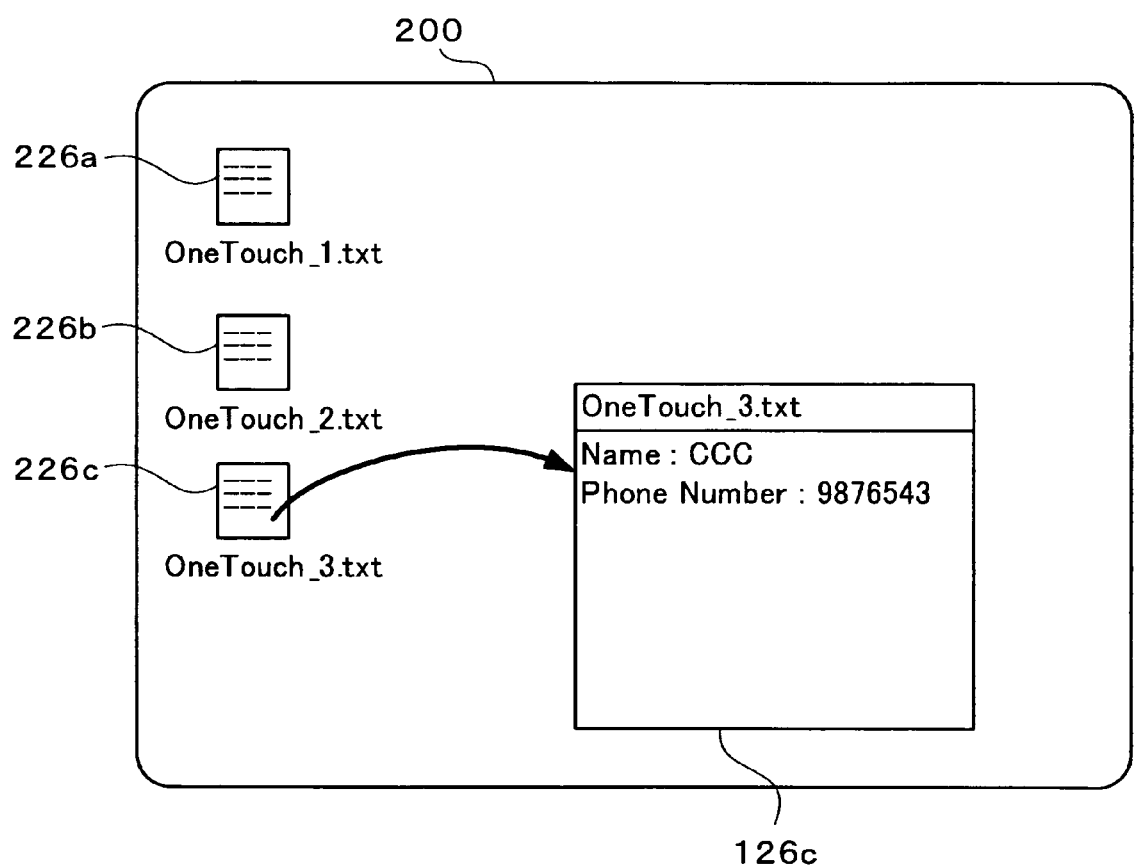
FIG. 6 shows an example of the display screen of a terminal.

Next, a description will be made for the process of the terminal 150. FIG. 6 is an example of the display screen 200 of the terminal 150. When file list request command (list-request) is transmitted from the terminal 150 to the facsimile machine 100, the facsimile machine 100 executes the processes of steps S104 and S106 in FIG. 3. Through these processes, file names having the number equal to the number of records included in the telephone book data 126 are transmitted to the terminal 150. The terminal 150 displays a received file name. As exemplified in FIG. 4, in the case where the telephone book data 126 includes the three record from the record number "1" to the record number "3", the screen 200 of the terminal 150 displays the three file names of "OneTouch_1.txt", "OneTouch_2.txt" and "OneTouch_3.txt", and icons 226a, 226b and 226c showing each file. When the user of the terminal 150 double-clicks the icon of "OneTouch_3.txt", a file readout command (readout-request) designating "OneTouch_3.txt" is transmitted from the terminal 150 to the facsimile machine 100. The facsimile machine 100 executes the process of steps S108, S110 and S112 in response to the file readout command. Through these processes, the facsimile machine 100 converts the contents of the record of record number "3", which is specified by file name "OneTouch_3.txt", into the text file, and transmits it to the terminal 150. As a result, the text file 126c describing the contents of the record of record number "3" is displayed on the screen 200 of the terminal 150. After editing the text file 126c, the user inputs a store command to the terminal 150. When the user inputs the store command, the terminal 150 transmits the file write command designating "OneTouch_3.txt" to the facsimile machine 100. The facsimile machine 100 executes the processes of steps S114, S120 and S124 in response to the file write command. Through these processes, the facsimile machine 100 updates the contents of the record of record number "3" on the contents of the edited text file 126c. In the case where the contents of the file designated by the file write command do not correspond to the record of the telephone book data, the "error message notifying no write permission" transmitted from the facsimile machine 100 is displayed on the display screen 200. Further, since the store command of the text file 126c is not accepted, the contents of the text file 126c before editing are maintained.

As described above, the facsimile machine 100 converts the record of the telephone book data 126 into the text file and transmits it to the terminal 150. Therefore, the user of the terminal 150 can view or correct the telephone book data as a text file on a record basis. The user of the terminal 150 can easily view and correct the telephone book data.

Since each record is attached with a record number, the user of the terminal has only to edit a text file including records to be updated alone, and transmit it to the facsimile machine 100.

Note that the facsimile machine 100 may not store the telephone book data 126 in the text File format. For example, it may store the data in a format expressing a number of one digit in one byte. In the case of a text format, 2 bytes capacity is necessary to store the number of one digit. By storing the number of one digit on the format expressing it in one byte, the telephone book data 126 can be stored with a smaller volume. Regardless of the format used for storing the telephone book data 126, the telephone book data 126 can be converted into the text file on a record basis if a format used in storing is known.

The telephone book data 126 in the above-described example is equivalent to an example of the "database being the mass of a plurality of records each of which describes individual information".

The CPU 110, when it receives a command from the terminal and executes the processes of steps S102, S108 and S104, is equivalent to an example of the "receiver". The CPU 110, when it executes the process of step S110, is equivalent to an example of "file creating module". Note that in step S110, the CPU converts designated record into the file of text format by the file readout command. The file of text format is a file that the terminal 150 can display on the screen. Therefore, the file of the text format converted in step S110 is equivalent to an example of "terminal-viewable file".

The CPU 110, when it executes the processes of steps S112 and S106, is equivalent to an example of the "transmitter".

The CPU 110, when it executes the process of step S104, is equivalent to an example of the "identifier creating module". Note that the "file name" created in step S104 is equivalent to an example of the "record identifier for identifying each record".

The telephone number or the e-mail address described in each record of the telephone book data 126 is equivalent to an example of the "address information". Note that the "address information" is an example of the "communication address information".

The "one-touch number" described in each record is equivalent to an example of the "readout information".

In step S104, the record name of a record where "NO" is set to the "read permission/prohibition information" is not created. The process of step S104 that the record name of a record where "NO" is set to the "read permission/prohibition information" is not created is equivalent to an example of the "prohibiting module".

In step S114 of FIG. 3, the facsimile machine 100 receives a file together with the file writing command. The process of step S114 where the file is received together with the file writing command is equivalent to an example of the "file receiver". The CPU 110, when it executes the process of step S124, is equivalent to an example of the "updating module".

Although the file name is used as the one-touch number in the above-described example, the name is not so limited. For example, the record number may be used as the file name or the address name may be used as the file name. By using the address name as the file name, the telephone book data can be provided to the terminal 150 on a record basis, as long as it is the telephone number corresponding to the one-touch key or a record with which the telephone number is registered. Further, by using the address name as the file name, the user can specify a target file on the terminal 150 by the file name out of the list more easily than the record number.

Since the list of the reading prohibited file is not transmitted, the file is prohibited from being selected from the terminal 150, but the invention is not so limited. For example, although the file name is transmitted in the list-request, a process that the contents of file is not displayed but an error message is displayed even if the file is double-clicked on the terminal 150, or the like may be performed. At this point, after judging that the file name designated in S108 exists, the facsimile machine 100 judges whether or not a record corresponding to the designated file name is set to "readout permitted". When judgment is made that the file is set to "readout permission", process moves to S110. When judgment is made that the file is set to "readout prohibition", process moves to S116 to perform a process of creating an error message and transmitting it to the terminal. The error message to be created at this point may be the message of "no appropriate file" or may be the message notifying "viewing prohibited".

It is possible for setting of the read permission/prohibition information (the flag of allowing viewing/the flag of prohibiting viewing) registered with the telephone book data 126, but not limited to, that "YES" (reading permitted) is set in advance in default setting and the setting may be changed to "NO" (reading prohibited) by the operation of the facsimile machine 100, for example.

In the case where contents registered with the record of a corresponding record number in the write request is a telephone number and contents that received the write request is an e-mail address, the telephone number may be deleted and the e-mail address may be written. Alternatively, the e-mail address may be written in addition to the telephone number.

Some of the preferred technical features of the technology disclosed in the above embodiments will be described below.

It is preferable that the communication device comprises an identifier creating module that creates a different record identifier for each record. At this point, the above-described receiver may receive a list-request of a plurality of records in the database from the terminal. Further, the above-described transmitter may transmit a plurality of record identifiers created by the identifier creating module to the terminal.

Such a communication device transmits a record identifier to the terminal that requests a list of records (specifically, a list of addresses described in the telephone book data, for example). The list of records can be shown to the user of the terminal without transmitting all about what is described in the record. The user of the terminal can specify a desired record from a plurality of record identifiers.

It is preferable that the receiver receives the readout-request of a specific record together with a predetermined record identifier among the plurality of transmitted record identifiers by the transmitter. At this point, it is preferable that the transmitter transmits the terminal-viewable file created based on the specific record designated by the received record identifier. One record can be designated from a plurality of records because of the record identifier.

It is preferable that the transmitter transmits the file name (appellation) of the file created by the file creating module as record identifier.

The user can easily appreciate the relationship between files created by the file creating module and the record identifier.

It is preferable that the file creating module creates the terminal-viewable file subject to receiving the readout-request of the specific record. File conversion of the unbrowsed records on the terminal can be avoided.

The individual information described in a record may include address information (telephone number of a communication address, for example) that the communication device uses for specifying another communication device in order to transmit data to the other communication device. It is preferable that the communication device comprises a plurality of operation keys to each of which address information for specifying each of the other communication devices corresponds. In response to the operation key operation of the user, the communication device reads out address information that corresponds to the operation key. One of the examples of the function is making a phone call to a desired communication address only with one key operation of the user, which is called "one-touch dial".

The readout information may be linked to each of the operation keys. At this point, it is preferable that the identifier creating module creates the readout information as record identifier of a record that corresponds to one of the operation keys linked to the readout information. The "readout information" may be a number of 1 digit or 2 digits, for example. A long-digit number like a telephone number is not necessary, but is enough digits for perceiving the number of addresses stored in the communication device.

Normally, the user of the communication device can easily specify a communication address information based on the one or two digit readout information. Therefore, he/she can easily identify desired communication address information, only with the record identifier from the terminal.

Particularly, even in the case where a large number of registered address are stored in the telephone book data, the user of the terminal can easily find a desired address.

Moreover, each record may have a flag of view permission/prohibition from the terminal. The communication device may comprise a prohibiting module. In the case where the view prohibition flag (a flag of prohibiting viewing) is set on the specific record designated by the received readout-request, the prohibiting module prohibits the transmitter from transmitting the terminal-viewable file.

Regarding personal data to be kept from the others' eyes, the device may comprise a prohibiting module, which limits viewing from the terminal, for higher security.

The viewing permission/prohibition from the terminal may be set to each record. The transmitter has only to transmit a record identifier of a viewing permitted record when the receiver received a list-request.

Since a record identifier inaccessible from the terminal (it may be a file name, for example) is not transmitted out of file names that corresponds to the list of records, undesirable readout-request of the communication address information by the user can be avoided.

Each record stored in the storage may be attached with identifying information for identifying the record. At this point, the communication device may comprise a file receiver that receives a file including identifying information and new individual information from the terminal; and an updating module that updates the individual information of a record, which is identified by identifying information included in a received file among the records in the database, by new individual information included in the received file.

The telephone book data can be updated only by receiving a file including records to be updated alone.

It is preferable that the storage stores database (telephone book data for example) with a data format of smaller volume than the total volume of all files where the all records are respectively converted. The telephone book data can be stored with a smaller storage volume.

Although the specific examples of the present invention have been described above in detail, these are only examples and do not limit the scope of claims. The technology described in the scope of claims includes various changes and modifications of the specific examples exemplified above.

Further, the technical elements exemplified in this specification or the drawings exert technical utility independently or in various combinations, and are not limited to the combinations of claims described in the application originally filed. Further, the technology exemplified in this specification or the drawings simultaneously achieve a plurality of objects, and achieving one object out of them itself has technical utility.

What is claimed is:

1. A facsimile machine capable of communicating with a terminal through a network, the facsimile machine comprising:
   a storage that stores a telephone book data in which a plurality of address information is recorded, each of the plurality of address information corresponds to each of a plurality of other facsimile machines to which the facsimile machine is able to transmit facsimile data, and stores computer-executable components; and a processing unit configured to execute the computer-executable components, which when executed, cause the facsimile machine to provide a file creating module, a receiver, a transmitter and an updating module, wherein:

the file creating module creates a plurality of text files, each of which is converted from each of the plurality of address information recorded in the telephone book data, and is viewable on the terminal, wherein an identifier is attached to each of the plurality of address information, and the file creating module creates a file name for each of the plurality of text files so that the file name includes the identifier that corresponds to the address information of the created text file;

the receiver receives a list-request of the plurality of address information from the terminal;

the transmitter transmits file names of the plurality of text files to the terminal in response to the list-request;

the receiver also receives a readout-request that designates one of the file names of the plurality of text files from the terminal;

the transmitter transmits one of the plurality of text files designated by the readout-request to the terminal in response to the readout-request;

the receiver also receives from the terminal a new text file including new address information corresponding to at least one of the other facsimile machines to which the facsimile machine is able to transmit facsimile data; and the updating module updates the telephone book data by registering the new address information included in the new text file transmitted from the terminal.

2. The facsimile machine as in claim 1, wherein the computer-executable components, which when executed, cause the facsimile machine to provide:

a flag to determine whether or not to allow the text file to be viewed on the terminal is set to each of the plurality of text files, wherein the transmitter transmits the file names only for the text files on which the flag of allowing viewing is set in response to the list-request.

3. The facsimile machine as in claim 1, wherein:

the facsimile machine further comprises a plurality of operating keys, each of which corresponding to each of the plurality of address information, wherein, for each of the plurality of address information, address information corresponding to one of the plurality of operating keys is read out in response to a user operation of the one of the plurality of operating keys.

4. The facsimile machine as in claim 1, wherein the computer-executable components, which when executed, further causes the facsimile machine to provide:

a flag to determine whether or not to allow the text file to be viewed on the terminal is set for each of the plurality of text files; and a prohibiting module that prohibits the transmitter from transmitting the one of the plurality of text files when the flag of prohibiting viewing is set on the one of the plurality of text files designated by the received readout-request.

5. The facsimile machine as in claim 1 wherein the storage stores telephone book data with a format by which a volume of the telephone book data is smaller than a total volume of files converted from all of the plurality of address information.

6. The facsimile machine as in claim 1, wherein the computer-executable components, which when executed by the processing unit, further cause the facsimile machine to provide a prohibiting module that allows the transmitter to transmit or prohibits the transmitter from transmitting the text file based on view permission/prohibition information associated with the one of the file names of the plurality of text files designated by the received readout-request.

* * * * *